United States Patent [19]
Klein

[11] 3,983,657
[45] Oct. 5, 1976

[54] SNELL WITH END CONNECTORS

[76] Inventor: Gerald Bernard Klein, 13451 Stuart Court, Broomfield, Colo. 80020

[22] Filed: May 30, 1975

[21] Appl. No.: 582,348

Related U.S. Application Data

[63] Continuation-in-part of Ser. No. 473,721, May 28, 1974, abandoned, which is a continuation-in-part of Ser. No. 277,756, Aug. 3, 1972, Pat. No. 3,834,061, and Ser. No. 274,307, July 24, 1972, Pat. No. 3,857,645, and Ser. No. 335,081, Feb. 23, 1973, Pat. No. 3,898,760, each is a continuation-in-part of Ser. No. 128,015, Feb. 27, 1973, Pat. No. 3,717,907.

[52] U.S. Cl............................. 43/44.83; 43/44.98
[51] Int. Cl.² ....................................... A01K 91/04
[58] Field of Search............ 43/44.98, 44.83, 44.86, 43/42.72; 128/130

[56] References Cited
UNITED STATES PATENTS

| | | | |
|---|---|---|---|
| 2,085,320 | 6/1937 | Kolstrand | 43/42.72 |
| 2,533,418 | 12/1950 | Benoit | 43/44.83 |
| 3,210,883 | 10/1965 | Vish | 43/44.83 |
| 3,577,987 | 5/1971 | Bronnenkant | 128/130 |

*Primary Examiner*—Warner H. Camp
*Attorney, Agent, or Firm*—Dennis O. Kraft

[57] ABSTRACT

A snell for connecting a fishhook to a line or leader. The snell, a strand of nylon or like material, is formed with a hook connector at one end and a line connector or eye at the other end as a unitary structure. The hook connector provides a socket to receive and hold the shank end of a hook. The line connector is formed with a passageway commencing at its extended end and exiting from the side of the connector. This passageway receives the end of a line which is threaded through the passageway, knotted and secured thereinto. The mode of manufacture of this snell is to form the same by molding the strand and connectors as a unit. The strand may be subsequently drawn to increase its strength and to reduce its diameter.

3 Claims, 10 Drawing Figures

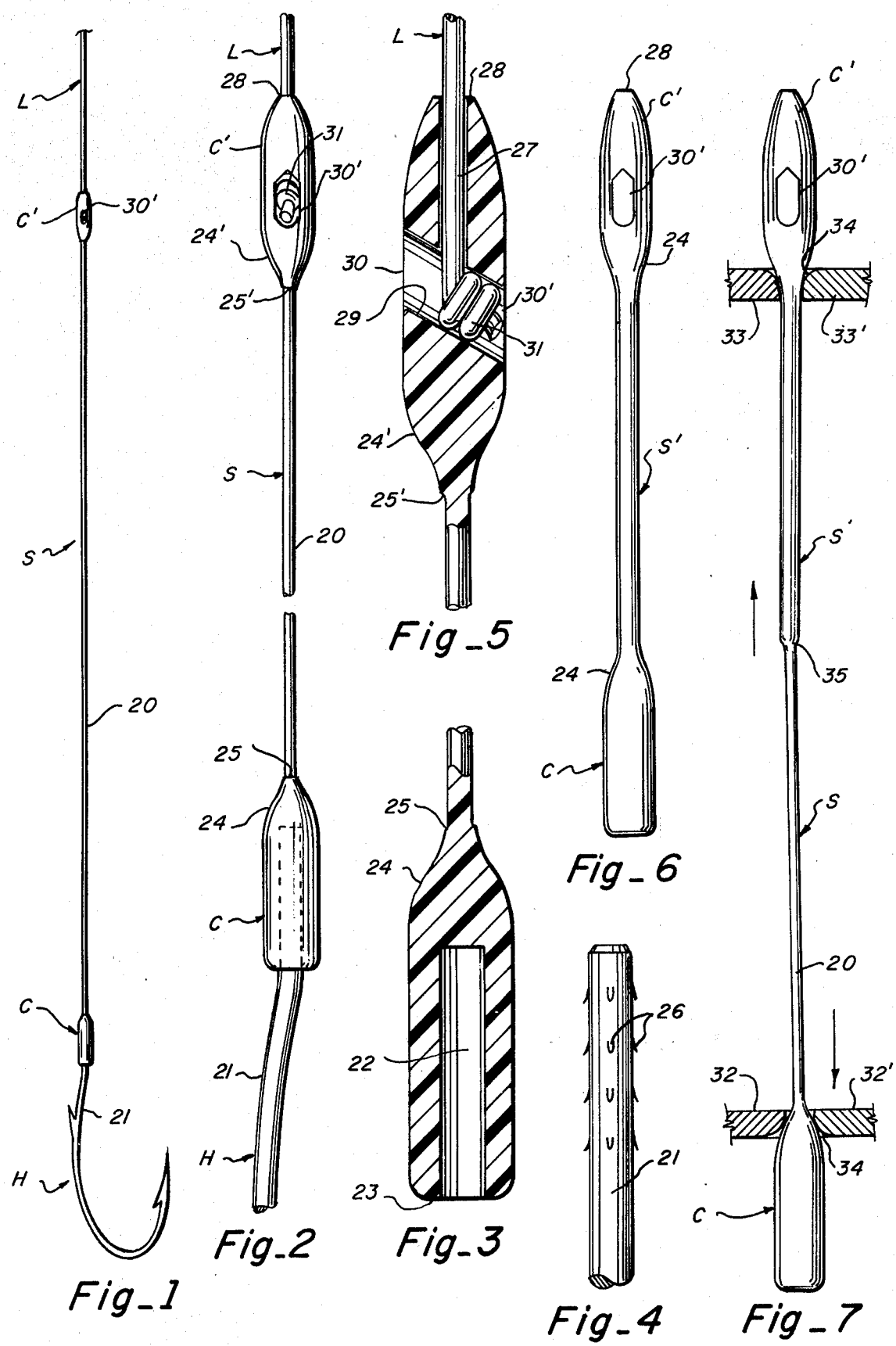

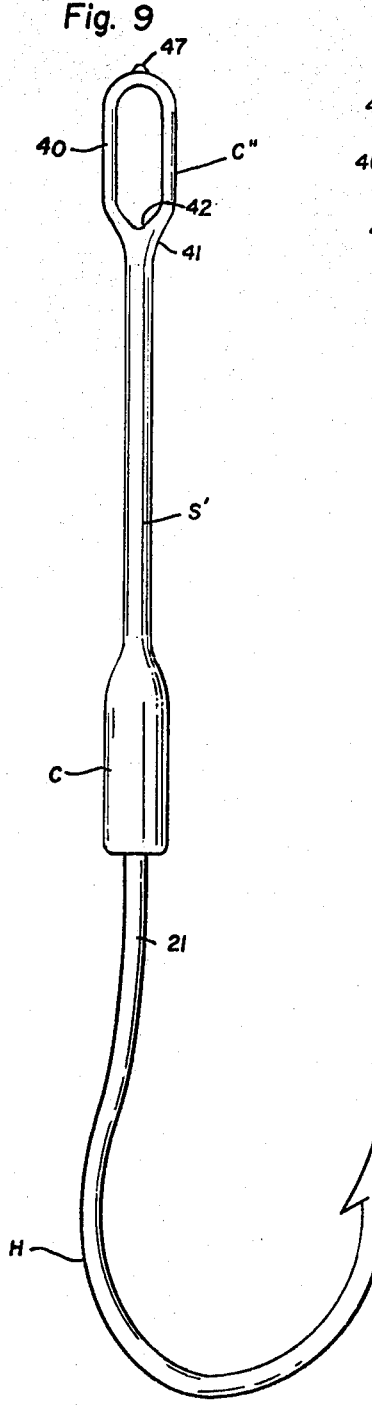
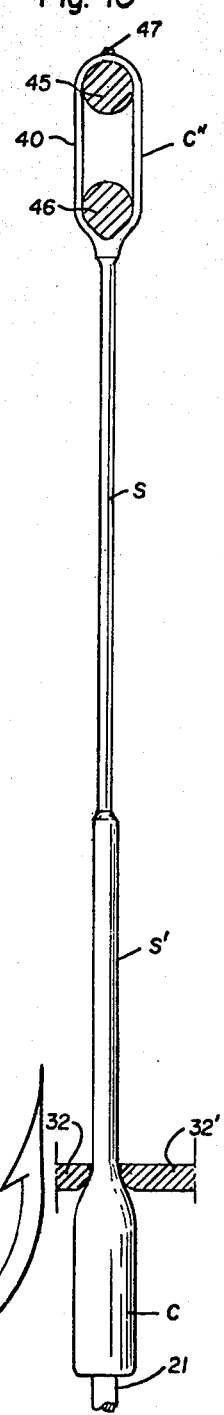
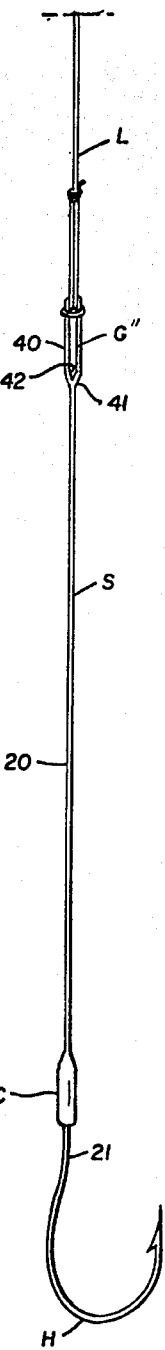
Fig. 9
Fig. 10
Fig. 8

SNELL WITH END CONNECTORS

This invention is a continuation-in-part of my application for SNELL WITH END CONNECTORS, Ser. No. 473,721 filed May 28, 1974 (now abandoned), which, in turn, is a continuation-in-part of my applications for: (a) Leader Connector, Ser. No. 277,756, filed Aug. 3, 1972 (now U.S. Pat. No. 3,834,061); (b) Leader with Connector, Ser. No. 274,307, filed July 24, 1972 (now U.S. Pat. No. 3,857,645); and (c) Hook Connector, Ser. No. 335,081, filed Feb. 23, 1973 (now U.S. Pat. No. 3,898,760), all of which were continuation-in-part applications of the invention LEADER CONNECTOR, Ser. No. 128,015 which issued as U.S. Pat. No. 3,717,907 on Feb. 27, 1973.

This invention relates to the attachment of one end of a snell to a fishhook and the other end of the snell to a line or leader, and more particularly to a snell construction having connectors at its ends to facilitate the attachment of fishhooks and lines thereto. Accordingly, the invention will be called a "Snell With End Connectors".

The invention relates more specifically to a snell formed of nylon or similar plastic material having a hook connector at one end thereof and a line connector at the other end thereof, and wherein the snell and the end connectors are formed as a simple, unitary structure. The invention also concerns the manufacture of a snell with end connectors.

Conventionally, a fishhook is formed with an eye at its shank end. One end of a snell, a strand of silk or nylon, is connected to this fishhook by threading the snell through the eye of the hook and tying it upon the shank of the hook adjacent to the eye. The other end of the snell is attached to a leader or a line and ordinarily, a loop is tied at the end of the snell so that the snell may be easily attached to a leader or a line. The knots used for tying a snell to a hook and for tying a line-connecting loop must be special, double-looped knots since nylon or silk strands commonly used for this purpose are very slippery when wetted. If common knots are used, they will slip loose from the hook or the line, usually at the time when a good fish is caught.

This tying of knots in a snell to attach the hook and to form a loop at the opposite end of the snell requires both skill and time and is a major expense in the manufacture of fishhooks having snells attached to the hooks. It can also be a problem where a fisherman ties his own snells onto his hooks, for he must carefully tie proper knots onto the hook to prevent the snell from slipping when it is wet. This requires a high degree of skill and patience and can become especially difficult when a fisherman is not in a well lit area, but is along a bank or in a boat when weather conditions are not the best. Thus, many fishermen prefer fishhooks with snells attached to them.

It follows that there is a real and definite need for an improved and simplified mode of connecting a snell onto a hook and such need is especially apparent in a production line where snells are being tied onto hooks in large quantities and especially in present times when labor costs are constantly increasing.

The present invention was conceived and developed with the foregoing and other considerations in view and the invention comprises, in essence, a snell of nylon or similar material having a hook connector at one end thereof and a leader connector at the opposite end thereof as a unitary structure. The invention also encompasses a simple method for the manufacture of a snell having connectors attached to its ends as a unitary product.

It follows that a primary object of the invention is to provide a novel and improved construction of a snell having connectors at its end as a unitary structure, to simplify the problems of attaching a hook to one end of the snell and attaching a line, or leader, to the other end of the snell.

Another object of the invention is to provide a novel and improved snell having a hook attached thereto by a small, simple connector at one end of the snell which receives the shank of the hook.

Another object of the invention is to provide a novel and improved snell having a connector at each end of the snell with a hook permanently secured into a hook connector at one end, and with a line connector at the opposite end of the snell whereto a line, or leader, may be quickly and easily attached.

Another object of the invention is to provide a novel and improved snell having a connector at each end of the snell with a hook permanently secured into a hook connector at one end, and with a simple, molded eye at the opposite end of the snell which is suitably tempered whereto a line, or leader, may be quickly and easily attached.

Another object of the invention is to provide a novel and improved snell-hook combination, wherein the snell has a comparatively small hook connector at one end which is secured to the shank of a hook as a neat appearing construction, and which is especially suitable for threading bait or worms upon the hook and upon a portion of the snell beyond the hook.

Another object of the invention is to provide a novel and improved snell having end connectors which are manufactured in a simple manner in easy forming and drawing steps.

Other objects of the invention are to provide a novel and improved snell having connectors at its ends which is a simple, strong, neat appearing, low cost unit.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1 shows the improved "snell with end connectors" having a hook secured to a hook connector at its base end and a line attached to a line connector at its top end;

FIG. 2 is an enlarged view of the snell shown at FIG. 1, but with the lower portion of the hook and an intermediate portion of the snell being broken away to conserve space;

FIG. 3 is a fragmentary sectional detail of the hook connector per se and an adjacent portion of the snell, as taken substantially from the indicated line 3—3 at FIG. 2, but on an enlarged scale;

FIG. 4 is a fragmentary view of a hook to show the end of a hook shank which is to be fitted into the hook connector shown at FIG. 3;

FIG. 5 is a fragmentary sectional detail of the leader connector and an adjacent portion of the snell, and also a portion of the line therein, as taken substantially from the indicated line 5—5 at FIG. 2, but on an enlarged scale;

FIG. 6 is a view of the snell with end connectors such as that shown at FIG. 2, but illustrating the same as it appears when initially formed as by injection molding;

FIG. 7 is a view of the snell with end connectors shown at FIG. 5, but illustrating a drawing step in progress which is needed to finish the snell.

FIG. 8 is a view similar to FIG. 1, but showing a modified embodiment of the invention using a loop on the snell to connect a line to the snell.

FIG. 9 is a view of an undrawn snell similar to FIG. 6, but illustrating the modified embodiment of the invention using an eye loop on the snell and also, showing the hook in place.

FIG. 10 is a view similar to FIG. 7, showing the snell of FIG. 9 as when the drawing operations of both the snell and eye loop are in progress.

Referring more particularly to FIGS. 1 – 7 of the drawings, the improved snell with end connectors is formed as a small diameter snell strand S, having a hook connector C at its base end and a line connector C' at its top end, all as a one-piece, unitary structure. FIGS. 8, 9 and 10 show a loop connector C'' at the top end of the snell which will be hereinafter further described. It is to be understood that the references to the base end and top end of the snell are arbitrary and are used only to facilitate the description of the snell herein. Also, it is to be understood that the "line" herein referred to may be, and usually will be, a nylon leader, as well as any other conventional type of a fishing line. This snell with end connectors is made with nylon or like material essentially the same as used in the manufacture of conventional snells; however, it will be manufactured by injection molding process instead of an extrusion process. Thus, while the cost per unit might be increased, the greater costs for tying knots is eliminated and thus, the manufacture of the snell by an injection molding process, as hereinafter described, will actually be a low cost operation. When a snell with end connectors is used, a hook will be attached to the hook connector C, either at the time the connector is formed, during the molding operation, or subsequently by thrusting the shank 21 of the hook H into a socket within the body of the connector. This will ordinarily be a factory operation. A line will be attached to the line connector C' by threading an end of the line into a passageway in the top of the connector, as will be hereinafter described, and this will ordinarily be a field operation performed by a fisherman whenever he uses a snelled hook.

The hook connector C at the base of the snell, best shown at FIGS. 2 and 3, is a small elongated body which may be somewhat cigar shaped or nearly cylindrical as shown. This connector C is preferably symmetrical about its longitudinal axis and it is formed with an axially centered socket 22 having an opening at the bottom end 23 of the connector, opposite the snell strand 20. The bottom end of the connector may be flat or slightly rounded as illustrated, or even tapered. The socket 22 is proportioned to receive the hook shank 21 and FIG. 3 shows the outside diameter of the hook connector C as being approximately three times the diameter of the socket 22. Actually, this outside diameter may be much less and its actual size will depend to a great extent upon the strength and rigidity of the nylon forming the unit, but more so upon the strength of the shank strand 20. In any event, this diameter of the hook connector need not grossly exceed the diameter of the hook shank.

The opposite top end of the hook connector C merges with the small diameter snell strand 20 and it is desirable that this change from the larger diameter of the connector to the smaller diameter of the strand 20 be effected through a smooth transition section 24 having its corner portions well rounded to prevent any disruption of the surface of the connector C or strand S at the edges of this transition section. The snell strand 20, if formed of nylon or like material, must be drawn to align the molecular structure within the strand to an arrangement which provides for a maximum tensile strength. This is important since the strand 20 may have to be of a very small diameter to prevent it from being obvious and apparent to a fish. Thus, while the strand must be drawn, the connectors at each end of the strand, which are formed by a molding operation, will not be drawn. Thus, it becomes desirable for the end of the transition section 24 adjacent to the strand to gradually increase in diameter either by a taper or by a curving, flaring section as illustrated at FIG. 2 to permit the effect of drawing the strand 20 to merge into the transition section without a sudden disruption of the internal structure between the strand and the connector. When a drawing occurs, the reduction of the strand diameter will form a moving shoulder, as hereinafter described, and this shoulder portion will ultimately move from the strand 20 and to the transition section, but the drawing will cease as the cross sectional area of the transition section increases to the point where it has the same tensile strength as that of the drawn strand 20. The terminal point of the draw may produce a uniform surface at the transition or it may be more abrupt to produce a slight ring-like disruption 25 a short distance from the point where the transition section merges with the strand 20.

It is essential that the hook shank 21 fit tightly into the socket 22 and require a substantial force to pull it out. The shank may be fitted into the socket 22 at the time the snell is formed by injection molding. Also, the shank may be thrust or otherwise fitted into this socket as a final step in preparation of a snell-hook combination which can be offered to the public for sale so that an ultimate user can attach the snell-hook combination to a line L as he desires. When the hook shank is trust into the socket, the socket 22 may be slightly smaller than the diameter of the hook shank 21 so that the connector will stretch to produce a desirable tight fit. The opening of the socket at the bottom 23 of the connector may be square as shown, or it may be belled or chamfered to facilitate guiding the shank into the socket, and a belled opening, not shown, is especially desirable where the hook shanks are inserted as a machine operation.

The natural grab effect between the shank 21 and the connector C fitted in this manner, is adequate to hold the snell onto the end of a hook and in tests, the snell would often break before the connector C would slip off the hook shank. However, it was found desirable to provide a more positive holding action by the connection between the hook shank 21 and the connector C and a holding means could be easily provided on the shank of the hook, such as barbs 26, as shown at FIG. 4. These barbs 26 are slanted away from the end of the hook shank 21 to permit the shank to be easily inserted into the socket to the position shown at FIG. 2, but the barbs will bite into the walls of the socket 22 to prevent the withdrawal of the hook from the connector. Tests demonstrated that the force required to pull the hook from the socket was substantially increased, to the point where the snell strand 20 would break before the hook shank would release from the connector C.

Other modes of securing the hook shank into the socket are possible when the shank is thrust into the connector socket 22. For example, the hook shank may be welded in the socket by heat, solvents, cement or ultrasonic action. Instead of being straight, the hook shank 21 may be undulated, stepped or serrated to more tightly fit into the connector socket 22. However, such alternate forms of a holding means to better hold the hook shank in the socket can be devised by an artisan and hence, such alternates need not be shown. It is to be emphasized that the unitary snell-connector combination, when connected with a hook as above described, provides an exceedingly simple, neat and effective structure.

The line connector C' at the top end of the snell is best shown at FIGS. 2 and 4 and is a small, elongated body approximately the same size as the hook connector C and it also may be either cylindrical or cigar-shaped. This connector C' is symmetrical about its longitudinal axis and it is formed with an axially centered passageway 27 having an opening at its top end 28, opposite the snell strand 20. This passageway 27 extends into the connector about half way to connect with a transverse hole 29 which, preferably, has an inclined floor portion 29' and thus, the transverse hole forms opposing upper and lower side openings 30 and 30' at the center portion of the connector.

The diameter of the passageway 27 is selected to receive the end of a line L which will ordinarily be slightly larger in diameter than the diameter of the snell shank 20. It is contemplated that this passageway diameter 27 may be varied to provide for different sizes of lines and leaders commonly used for fishing, but actually it was found that a given passageway size could be used with several different size lines or leaders which were smaller in diameter than the passageway so that any of the lines or leaders would fit into the passageway with a smooth, easy, sliding fit. The transverse hole 29 is slightly larger or wider than the diameter of the passageway 27 to receive a knotted end of a line, which is knotted in such a manner as to be large enough so it will not fit into the passageway 27. The transverse hole 29 and the side openings 30 and 30' may be round, oval or even somewhat slot-shaped such as illustrated at FIG. 2 and the opening will be proportioned in such a manner as to permit the connector to stretch slightly when the knotted end of a line, or leader 31, is pulled into it to assure a tight, non-slip fit. It is important to hold the knotted end of the line in the passageway 29 expecially if this line is a knotted leader which might otherwise slip if not tightly held.

The inclined floor portion 29' of the transverse hole 29, the preferred construction as mentioned and illustrated at FIG. 5, facilitates guiding the end of a line L which is threaded into the passageway 27, from the entrance at the end 28 of the connector C' and thence out of the lower side opening 30'. Thus, when a line L, or leader, is fitted into the passageway with a smooth, sliding fit, it will strike the floor portion 29' of the transverse hole 29 and easily project from the lower side opening 30' of the connector. Since the diameter of the side opening 29 is slightly greater than the diameter of the passageway 27, the line L may be knotted and the knotted end can be pulled back into the side opening 29 as illustrated. This size of the side passage may be slightly larger than the central passageway but, preferably, it will be one-third to two-thirds larger than the diameter of the central passageway to better receive such a knotted end of the line L for it is desirable to have this knotted end fit tightly into the side opening. So fitted, the line will not be able to slide through the central passageway 27 and will be securely connected to the connector C'.

The opposite, bottom end of the line connector C' merges with the small diameter snell strand 20 and it is desirable that this change from the larger diameter of the connector to the small diameter of the strand 20 be effected through a smooth transition section 24' having its corner portions well rounded to prevent disruption of the surface of the connector C' or the strand S at the edges of the transition section, the same as heretofore described in connection with the transition section 24 of the hook connector C. It is to be noted that when the drawing operation is completed, there may be a slight ring-like disruption 25' a short distance from the point where the transition section 24' merges with the strand 20.

FIG. 8 illustrates a modified construction wherein a line connector C' is formed as a simple loop 40, the strands of which may be slightly smaller in diameter than the snell strand 20. This loop 40 is molded into the snell, and preferably, this loop 40 is somewhat elongated in the direction of the axis of the snell shank 20 as illustrated. The juncture between the snell shank 20 and the loop 40 is a Y-branch 41 having a transverse diameter somewhat larger than the diameter of the snell shank 20 and larger than the loop strand 40. This Y-branch is formed with smooth transitions, with a rounded crotch 42 when the opposite ends of the loop strand 40 join. It is to be noted that not only must the snell strand 20 be drawn, but that the loop strand 40 must also be drawn to provide requisite strength and hardness to these strands to withstand the stress to which the loop will be subjected during use.

FIGS. 6, 7, 9 and 10 illustrate in a somewhat diagrammatic manner the essential steps for the manufacture of a snell having end connectors such as heretofore described. The art of making molds and the art of injection molding of various items is highly developed. Thus, a mold for the manufacture of a snell with end connectors C and C', or a mold with an end connector C and a loop C'' can be easily molded and the snells are formed in molds by ordinary injection operations with suitable nylon resins heated to a moldable state. The resulting unit, formed in a mold using connectors C and C', is illustrated at FIG. 6. A similar unit, formed in a mold using a connector C and a loop C'', is illustrated at FIG. 9. It is to be noted that these units constitute a first step in the manufacture of a snell with end connectors. The finished end connectors C and C', FIG. 6, are formed during the injection molding step and need not be modified further. On the other hand, the snell strand S' is significantly larger in diameter and shorter than the snell strand S which will exist in the finished unit after the unit is drawn. The loop connector C'', illustrated at FIG. 9, is also shorter and larger in diameter when it is molded and this loop must also be drawn.

The further step in the manufacture of the unit will be in drawing the snell strand S', shown at FIG. 6, or at FIG. 9, to a length which may be as much as several hundred percent of its original length. Such a drawing will be accompanied by a reduction in diameter of the strand but the smaller drawn strand will have a strength which even exceeds the strength of the original, larger diameter undrawn strand which is formed during the injection molding. It is necessary to draw the strand at a proper temperature and the drawing may occur as a subsequent operation. However, this can be easily worked out by a skilled artisan and need not be described further.

An exemplary drawing operation of the snell strand is shown at FIG. 7. In that drawing operation, each connector C and C' will be gripped by pairs of grippers 32 and 32', and 33 and 33', respectively. Each pair is formed with a belled opening 34 which receives the end of its connector C and C'. The grippers then move apart to draw the strand S'. This drawing action is not accomplished in a uniform manner over the entire reach of the nylon strand but is accomplished in a continuing manner, where a reducing of the strand diameter occurs at a shoulder 35 which moves from one position to another with the undrawn nylon strand S' at one side of the shoulder 35 and the drawn strand S at the other side of the shoulder 35. This shoulder moves in either direction toward the respective connectors and when the transition section 24 of one connector is reached, the drawing at that end of the snell will cease, while the drawing at the other end will continue until the transition section of the other connector at the opposite end is reached.

A preferred mode of manufacture is to mold the hook into the connector C at the time the snell is formed and thereafter hold the hook during the draw instead of holding the connector C by the grippers 33 and 33'. The hook may be gripped in any suitable manner or may be held by a simple post, not shown. The advantage of holding the hook during the draw is best realized in mass production operations because any defective connection of a snell and hook will cause the snell to pull away from the hook and thus, the operation will automatically reject such defective units.

The drawing of the snell strand S', shown at FIG. 9 where a loop connector C'' is used, involves the additional step of drawing the loop strand 40 of the connector C''. The drawing or tempering of the nylon loop strand 40 is essential to strengthen and also to harden the nylon after the same is molded, for a hard leader L could cut an undrawn nylon loop. Thus, the drawing of the snell strand S', shown at FIG. 9, will require a pair of grippers 32 and 32' to hold the connector C as heretofore described. Also, grippers might be applied to the Y-branch 41 to hold that branch while the snell strand is being drawn. However, because of the small size of the Y-branch, this could be impractical and a preferred mode of drawing is to draw the loop strand 40 simultaneously with, or after, the snell strand S' is drawn. Thus, a post 45 is used to hold the loop strand 40 against the pull of the grippers 32 and 32' at the opposite end of the snell S. If a single post 45 is used, the diameter of the loop strand 40 and snell strand S' should be balanced to require the same pull. Theoretically, the diameter of the snell strand S' should be 1.41 times the diameter of the loop strand, but a fair amount of leeway or variation is possible to obtain the desired result.

The diameter of the strand forming the loop strand 40 may be, but is not necessarily balanced with the diameter of the snell strand 20 by the ratio of 1.41 to 1 when the unit is molded. If not, the diameters of the strands are such that the combined strength of the two reaches of the loop strand 40 to the Y-branch 41 will exceed the strength of the snell strand 20. Thus, to assure a proper draw, a second post 46 is provided which seats at the crotch 42 of the Y-branch 41 to move away from the first post to assure that the loop connector C'' is also perfectly drawn.

In the manufacture of a snell with a loop connector C'', as an undrawn unit by an injection molding operation, it is desirable to flow material, to or from, the snell strand S' from or to both sides of the loop strand 40 and thence, from or to the apex of the loop. This will thus place a small nub 47 at the apex of the loop which is the remains of a cut-off stem formed by a vent lead or intake lead of the mold cavity forming the unit. Though preferable, this location of a vent or intake in the mold forming the unit is optional.

It may be necessary to draw the molded strand more than once, and an annealing step in the manufacture of the unit may be necessary before the second drawing operation is commenced.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. A snell of synthetic plastic resin for holding a fishhook and for attachment to a fishing line, comprising:
    a. a small-diameter snell strand of drawn resin sufficient to hold a selected load;
    b. an undrawn, enlarged portion at one end of the snell forming a generally cylindrical hook connector having a diameter which does not greatly exceed the diameter of a hook shank to be attached thereto and an axially centered socket extending into one end of the connector which is proportioned to receive the shank of a hook with a tight fit; and
    c. a cigar-shaped line connector means disposed at the opposite end of the snell strand for connecting with the end of a fishing line, said connector means constituting an undrawn enlarged portion joining the snell strand and having a diameter which does not greatly exceed the diameter of the fishing line, an axial passageway into the extended end of the connector means proportioned to receive the fishing line with a free sliding fit but which is insufficient to pass a knotted end of the line, and a transverse passageway with an opening in the side of the connector means near the center of the axial passageway and which is slightly larger than the axial passageway to receive a knotted end of a line passed through the passageways, knotted and pulled back with the knotted end fitting tightly into the transverse passageway.

2. A snelled fishhook comprising a small-diameter strand of a drawn synthetic plastic resin having a tensile strength sufficient to hold a selected load, a synthetic plastic resin connecting means integral with and disposed at one end of said drawn strand for attachment to a fishing line, and an undrawn enlarged portion of synthetic plastic resin integral with and disposed at the opposite end of said drawn strand, said enlarged portion defining a cylindrical sleeve having a diameter which does not greatly exceed the diameter of a hook shank and which envelopes and is molded about a shank of a fishing hook to secure said hook therein in a substantially permanent fashion.

3. A snell of synthetic plastic resin for holding a fishhook and for attachment to a fishing line, comprising:
 a. a small-diameter snell strand of drawn resin sufficient to hold a selected load;
 b. an undrawn, enlarged portion of synthetic plastic resin integral with said drawn strand and disposed at one end of the snell forming a generally cylindrical hook connector having a diameter which does not greatly exceed the diameter of a hook shank to be attached thereto and an axially centered socket extending into one end of the connector which is proportioned to receive the shank of a hook with a tight fit; and
 c. an eye loop of drawn synthetic plastic resin integral with and disposed at the opposite end of the snell, the drawn resin of said eye loop having a tensile strength substantially the same as that of said snell.

* * * * *